Feb. 28, 1961 P. F. HAYNER 2,972,999
TWO-STAGE, DIFFERENTIAL, HYDRAULIC SERVO VALVE
Filed Nov. 1, 1955 3 Sheets-Sheet 1

Paul F. Hayner
INVENTOR.

Paul F. Hayner
*INVENTOR.*

Paul F. Hayner
INVENTOR.

United States Patent Office 2,972,999
Patented Feb. 28, 1961

2,972,999

TWO-STAGE, DIFFERENTIAL, HYDRAULIC SERVO VALVE

Paul F. Hayner, Nashua, N.H., assignor to Sanders Associates, Inc., Nashua, N.H., a corporation of Delaware Filed Nov. 1, 1955, Ser. No. 544,218

15 Claims. (Cl. 137—85)

The subject matter of this invention is directed to electro-hydraulic servo valves which have a flow of hydraulic fluid proportional to a control signal and, more particularly, is directed to two-stage valves of this type utilizing electric control signals.

Hydraulic valves used to effect mechanical motion in response to an electrical control signal are well known. Initially, such valves were single-stage devices in which the electrical signals were applied to a solenoid which was either integral with or directly linked to a piston-valve whose motion controlled the pressure of an hydraulic flow in proportion to the intensity of the control signal. Such directly operated control valves, due to the high hydraulic forces reacting against the piston valve, require high-power solenoids. The need for high-level control signals to activate such solenoids and the extensive motion of the solenoids to effect control over an adequate range results in valves of this type having relatively low-frequency response. More recently, so-called two-stage valves have been developed to alleviate these power and frequency limitations. In a two-stage valve the armature of the torque motor does not directly actuate the main control piston valve but controls a small, relatively low-inertia auxiliary control valve. The relatively small motion of the auxiliary control valve hydraulically controls the main valve which, in turn, controls the machine or other controls of the device of which the valve is a part.

One form of two-stage valve is described in U.S. Patent 2,625,136 to W. C. Moog, Jr. In this two-stage valve a reed-like member is held in a balanced position under tension by balancing effects of a spring, a magnetic field and hydraulic pressure. Preferably, the reed is moved by changes in the magnetic field. Any slight change in the field will upset the hydraulic-spring balance resulting in an hydraulic pressure change acting on a main piston valve. This type of two-stage valve, though an improvement over the one-stage valve, has many deficiencies and limitations. It is necessary in the Moog valve to have highly filtered oil in both the second and first stages because of the valve's inherent low stiffness of the second stage. This results in use of large, cumbersome filters required to filter comparatively high quantity of flow through the second stage. Full hydraulic force is obtainable only when the reed is fully displaced. Any slight change in the tension of the spring or the hydraulic pressure or even in the strength of the magnetic field upsets the balance on the reed and consequently results in uncertain neutral positions and other spurious control effects. In addition, in order that the control effected by the reed be sensitive and nearly linear, it is essential that the response of the spring and of the magnetic forces on the reed be equal and opposite over the normal range of movement of the reed. Otherwise, the reed is extremely sensitive to changes in pressure of the hydraulic fluid. In practice due to the inherent non-uniform nature of magnetic fields and the need for moving the reed over a wide range from a neutral position to effect full control, the control resulting from the movement of the reed is non-linear. This valve also lacks stiffness when no control signals is being developed, since the second-stage valve is highly susceptible to stray Bernoulli effects, friction caused by oil contamination and to incidental changes in hydraulic pressure.

More recently another type of two-stage valve has been described which does not have the deficiencies and limitations of the Moog valve. This two-stage valve is the subject matter of applicant's copending application, Serial No. 454,895, now U.S. Patent 2,771,062. The valve described in that application employs a small, low-inertia control piston or pilot valve responsive to the electrical control signal. The pilot valve is mounted within the main piston valve and is movable with respect to the main valve. In operation, the electrical signal initiates movement of the pilot valve causing a change in the hydraulic pressures acting on the main piston valve and resulting in motion of the main piston valve. The main piston valve moves in a direction to rebalance these pressures and thereby re-position the main piston valve with respect to the pilot valve in a balanced or no-signal condition. Movement of the main piston valve effects desired enhanced changes in hydraulic pressures and these pressures are utilized to fulfill the purpose of the servo valve. This two-stage valve, in addition to having the desirable characteristics of high-frequency response and of requiring only relatively low-level control signals, has a substantially linear response and, due to the internal feedback between the main and pilot valves, exhibits desirable stiffness to minor system fluctuations. This valve also has the highly desirable characteristic of utilizing the full pressure of the hydraulic system with slight motion of the pilot valve.

Though the two-stage valve just described is entirely satisfactory for many applications, there are systems in which a substantially frictionless pilot valve with a higher frequency of response is desired and in which the hydraulic fluid employed for the pilot valve may be separate from that used for the main valve, thereby minimizing the need for filtering.

It is therefor an object of the present invention to provide a new and improved electro-hydraulic servo valve of the two-stage type which has a high response frequency.

It is a further object of the present invention to provide a new and improved electro-hydraulic servo valve of the two-stage type in which the hydraulic response to the electrical control signal is linear.

It is still an additional object of the present invention to provide a new and improved electro-hydraulic servo valve of the two-stage type in which the pilot valve moves over an extremely small range to effect full control.

It is a still further object of the present invention to provide a new and improved electro-hydraulic servo valve of the two-stage type in which the pilot valve has substantially frictionless motion.

It is still another object of the present invention to provide a new and improved electro-hydraulic servo valve of the two-stage type having internal feedback between the main valve and pilot valve.

It is also an object of the present invention to provide a new and improved electro-hydraulic servo valve of the two-stage type in which only the hydraulic fluid for the pilot valve need be filtered.

In accordance with the present invention there is provided a two stage, differential, hydraulic servo valve comprising a valve housing including passages for fluid under pressure, a piston valve movably mounted within the housing for controlling the flow of fluid through the passages and a variable pressure-fluid chamber. At least one fluid control orifice communicates with the chamber. In addition, the servo valve comprises auxiliary passages for coupling fluid under pressure into the chamber. Pilot means carried by and coupled to the piston valve are provided. The pilot means include a pilot valve movably mounted with respect to the orifice for effecting motion of the piston valve with respect to the housing by varying the effective size of the orifice to change the pressure of the fluid in the chamber. There are also provided motor means carried by the piston valve for moving the pilot valve with respect to the orifice in response to a control signal for differentially displacing the valves in response to a control signal to effect the pressure change.

For a better understanding of the present invention, together with other and further objects thereof, reference is made to the following description taken in connection with the accompanying drawings and its scope will be pointed out in the appended claims.

Figure 1:
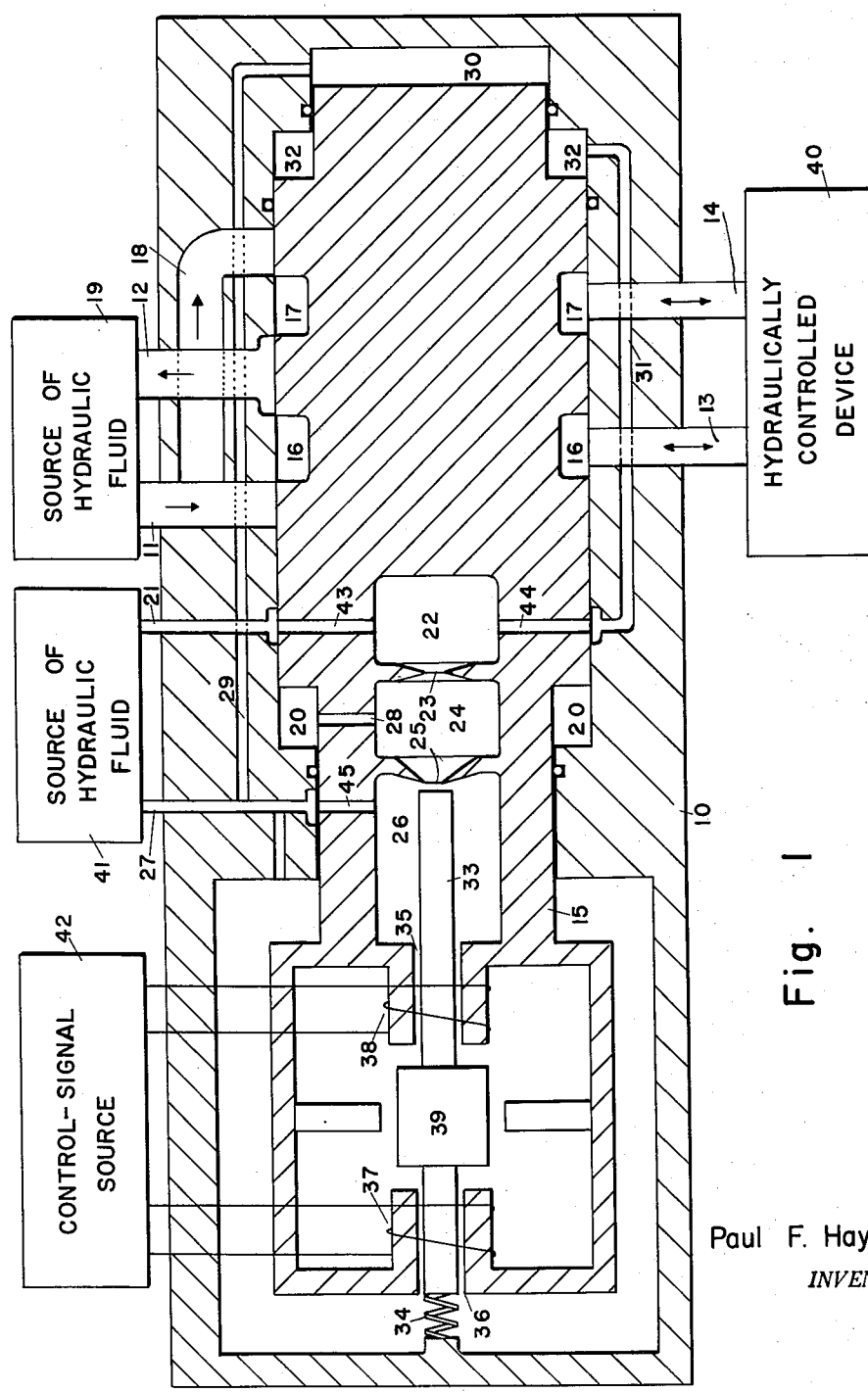
Fig. 1 is a longitudinal sectional, partially schematic, view of an electro-hydraulic servo valve in accordance with the present invention.

*Description of servo valve of Fig. 1*

The electro-hydraulic servo valve represented by the longitudinal sectional view of Fig. 1 includes a valve housing, specifically a cylinder 10 having passages for fluid under pressure. The cylinder 10 may be of any exterior form. Preferably, it has a rectangular exterior configuration for ease of mounting. The internal bore is preferably cylindrical with different diameters in different sections. An input passage 11, having a branch passage 18, and a return or exhaust passage 12 are coupled to a source of hydraulic fluid 19. Passages 13 and 14 provide output passages for the hydraulic fluid flowing through passages 11 and 12 and are coupled to an hydraulically-controlled device 40.

The electro-hydraulic servo valve also includes a piston valve 15, preferably a sleeve-like member of cylindrical form with sections of different diameters, movably mounted within the bore of the cylinder 10 for controlling the flow of fluid through the passages 11–14, inclusive. To provide means for effecting such control, the piston valve 15 includes circumferential passages 16 and 17 for coupling the output passages 13, 14 to the input passage 11 and the return passage 12 when the piston valve 15 is moved along the bore of the cylinder 10.

The electro-hydraulic servo valve also includes a variable pressure-fluid chamber 20 comprising a circumferential slot or depressed section around the piston valve 15. This chamber is walled on two sides by the bore of the cylinder 10 and on the other two sides by the outer surface of the piston valve 15.

In addition to the above, the electro-hydraulic servo valve comprises auxiliary passages including an orifice for introducing fluid under pressure to the chamber 20. More specifically, these auxiliary passages comprise an input passage 21 in the cylinder wall 10 coupled from a source of hydraulic fluid 41 through a passage 43, a cavity 22, a constriction 23, a second cavity 24, an orifice 25, a third cavity 26 and a passage 45, all in the piston valve 15, to an output passage 27. The passage 27 couples the return fluid from the chambers 26 and 30 to source of hydraulic fluid 41. If desired, both sources 19 and 41 may be combined into one. However, to minimize the introduction of foreign matter in the pilot-valve portion of the servo valve, it is preferable to have an independent source of hydraulic fluid. If the same source is used a filter, for example, a 10 micron filter should be interposed between the source and the passages 21 and 27. The cavity 24 is, additionally, coupled through a passage 28 to the chamber 20. An additional auxiliary passage 29 in the cylinder 10 couples a cavity 30 formed by one face of the piston valve 15 and a wall of the cylinder 10 to the outlet passage 27. An auxiliary passage 31 formed in the cylinder 10 couples another chamber 32, formed as a circumferential depression around one end of the valve 15, to the input passage 21 through a passage 44 into the piston valve 15 and the cavity 22. For reasons to be explained hereinafter, in the piston valve 15 the surface area in the chamber 32 normal to the longitudinal axis is one-half that in the chamber 20.

The electro-hydraulic servo valve of Fig. 1 also includes pilot means in the form of pilot valve 33 movably mounted with respect to the piston valve 15 and the orifice 25 for effecting motion of the piston valve 15 with respect to the cylinder 10 by varying the effective size of the orifice 25 to change the pressure of the fluid in the chamber 20. More specifically, the pilot valve is a small, light-weight plunger attached to a wall of the cylinder 10 by means of a compression spring 34, and substantially frictionlessly supported with respect to the piston valve 15 at the bearing areas 35 and 36.

Finally, the electro-hydraulic servo valve of Fig. 1 comprises motor means coupling the piston valve 15 and the pilot valve 33 for moving the pilot valve with respect to the piston valve and the orifice 25 in response to a control signal. More specifically, this motor means comprises electrical windings 37 and 38 coupled to a control-signal source 42 and wound around the portions of the piston valve 15. When energized, these windings electromagnetically couple the magnetic material 39 of the pilot valve 33 and the piston valve 15, the material 39 being either an integral part of the piston valve 33 or affixed thereto. The source 42 may be, for example, a gyro compass in an aircraft, a selsyn motor indicating positioning with respect to a reference or some equivalent source.

*Explanation of operation of valve of Fig. 1*

Considering now the operation of the electro-hydraulic servo valve of Fig. 1, in general the piston valve 15 is moved within the bore of the cylinder 10 to the right or to the left to cause the hydraulic fluid under pressure in source 19 to flow under pressure through the passage 13, if the piston valve is moved to the left, and to flow under pressure through the passage 14 if it is moved to the right. Pressures in the passage 13 cause an effect with one sense and in the passage 14 an effect with the opposite sense on the hydraulically controlled device 40. For example, if such device comprises the elevator controls of an aircraft, pressure through the passage 13 might deflect such controls to cause the aircraft to climb while a pressure through passage 14 will cause the aircraft to decrease its altitude. The pilot valve 33 and the motor means 37 and 38 are employed to effect movement of the piston valve 15.

Considering now the operation of the piston valve 15 in more detail, if such valve is moved to the right the circumferential passage 17 couples the fluid under pressure in passages 11 and 18 to passage 14, while the circumferential passage 16 couples the exhaust passage 12 to passage 13. If the piston valve 15 is moved to the left opposite effects take place in passages 13 and 14. That is, the pressure fluid in passage 11 is coupled through passage 16 to passage 13 while exhaust passage 12 is coupled through passage 17 to passage 14. To effect this movement in the piston valve 15, the pilot valve 33 is moved to increase or decrease the opening in the orifice 25. When pilot valve 33 is in a neutral position, that is, when no control signal is being developed, hydraulic fluid under pressure flows from source 41 through passage 21, chamber 22, chamber 24, orifice 25, chamber 26 and passage 27. This fluid also flows through passage 21, chamber 22 and passage 31 into chamber 32. In addition, fluid in chamber 30 at the right end of the piston valve 15 can flow through passage 29 into passage 27. The fluid flowing through chamber 22 has a predetermined pressure. Part of this pressure develops a force against the section of the end wall of the valve 15 in the chamber 32. Part of this pressure also exerts an opposing force against the section of end wall of this valve in the chamber 20. The remainder of the pressure is dissipated in causing fluid to flow through the orifice 25 and back through passage 27 to the source 41. The relative volume of flow of the fluid through the constriction 23 and through passage 31 is such that the pressure exerted by the fluid in the chamber 20 on the piston valve is approximately one-half that exerted in chamber 32 against the same valve when the valve is in neutral or no-signal position. To develop equal forces on the piston valve, the radial area of this valve over which the pressure is applied in chamber 20 is twice that in chamber 32. As the pilot valve 33 moves to the right to close the orifice 25, more pressure is applied through passage 28 against the piston valve in chamber 20. This upsets the balance of forces in chambers 20 and 32, the greater force in chamber 20 causing the piston valve to move to the right. If the pilot valve is moved to the left more widely to open the orifice 25, then the pressure in chamber 20 decreases thereby decreasing the force applied to the valve 15 in this chamber. As a result there is an excess of force in chamber 32 resulting in the piston valve moving to the left.

Motion of the pilot valve is effected by electrical signals applied to the windings 37 and 38, preferably connected in push-pull relation. Signals of one polarity develop magnetic fields causing the pilot valve 33 to move in one direction, while those of opposite polarities cause the pilot valve to move in the opposite direction. The pilot valve 15 moves in opposition to the restraining force of the spring 34. The resultant motion of the piston-valve 15 carries the pilot valve 33 with it until the restraining force of the spring 34 overcomes the force of the motor acting on the armature 39. Further motion of the valve 15 tends to increase the space between the pilot valve 33 and the nozzle 25 of the pressure chamber 24, tending to stop the valve 15 and restore static equilibrium. The valve 15 remains open until the control-signal is changed as, for example, by feedback from the controlled device 40. Conversely, when the valve 15 moves to the left, pressure in chamber 24 drops and valve 15 moves to the left. The spring 34 is compressed until its force overcomes the motor means and holds the valve 33 to decrease the effective opening of the nozzle 25 and stop the valve 15. The servo valve of the present invention thus has inherent degenerative feedback.

It should be noted that, due to the coupling of the electromagnetic control between the pilot valve 33 and the piston valve 15, as the pilot valve is moved in either direction, the hydraulic fluid builds up pressures on the piston valve causing the latter valve to follow the pilot valve to rebalance the relative positions of the pilot valve and piston valve. Thus, relatively little movement of the pilot valve is required to effect movement of the piston valve over any desired range. Practice has demonstrated that a maximum movement of the order of 2 mils is all that is required for the pilot valve 33 to vary the pressure in the chamber 20 from a minimum to a maximum and cause the piston valve 15 to move from one extreme position to the other. In addition, it should be noted that the fluid in the chamber 32 acts solely as a source of bias force for the force in the chamber 20. Consequently, if desired, suitable bias may be obtained by replacing the fluid in the chamber 32 with a spring.

To summarize the above detail operation, electrical signals applied to the pilot valve 33 cause movement of this valve to either close or open the orifice 25. Movement to close the orifice 25 causes hydraulic pressures to be developed which move the piston valve 15 to the right thereby rebalancing the positioning of the pilot valve and the piston valve. Widening the opening of the orifice 25 by movement of the pilot valve to the left causes hydraulic pressures on the piston valve 15 which cause it to move to the left again to rebalance the positioning of the piston valve and pilot valve. Movement of the piston valve in one direction will cause hydraulic fluid from source 19 to be applied to hydraulically controlled device 40 in one sense, while movement of the valve in the opposite direction will cause such hydraulic force to be applied to device 40 in the opposite sense.

It should be noted that a valve such as represented in Fig. 1 and in accordance with the present invention requires no dither of the pilot valve and an extremely low-level electrical control signal for high quality operation. Due to internal hydraulic feedback between the pilot valve and the piston valve, the piston valve is unyielding, up to the full pressure of the hydraulic fluid, to any frictional forces, including those caused by small solid matter in the hydraulic fluid. It is also unyielding in resisting the effects of minor changes in the pressure of the fluid. This provides a relatively stiff and sure operation. Full hydraulic pressure is applied to the piston valve with relatively little movement of the pilot valve. Being a null-seeking valve arrangement in which the piston-valve moves to reposition the pilot valve in neutral, a high order of linearity is obtained. Consequently, there is no need for a critically balanced pilot valve mechanism. A valve such as described in Fig. 1 may be relatively inexpensive and is simply assembled. In the valve of Fig. 1 separate hydraulic fluid sources may be used for the pilot-valve and piston-valve mechanisms, thereby facilitating the use of a small amount of well-filtered fluid for the pilot-valve mechanism and relatively coarse, unfiltered fluid for the piston-valve mechanism. If separate fluid sources are not desired, then a small filter may be employed in the passages connecting the pilot-valve mechanism to the fluid source.

Figure 2:
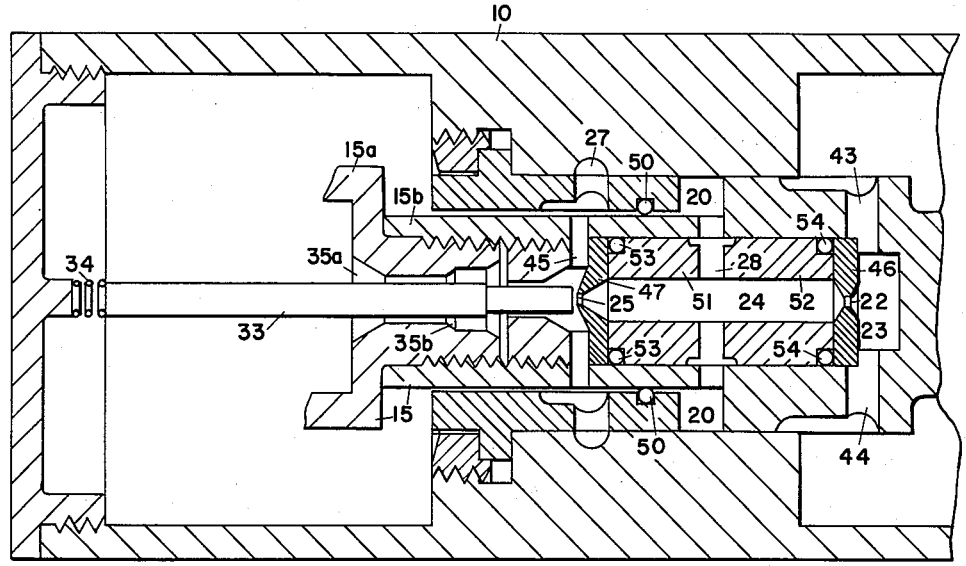
Fig. 2 is a detailed, sectional view of a portion of the valve represented by Fig. 1.

*Description of the portion of valve of Fig. 2*

That portion of the valve of Fig. 1 in the vicinity of the cavities 22, 24 and 26 is represented in more complete detail in Fig. 2. Identical elements are identified by the same reference numerals in both figures.

In Fig. 2 it will be seen that the piston valve 15 comprises two sections 15a and 15b, threaded one into the other to form the valve 15. The bearing surface 35 comprises two bearings 35a and 35b. The bearing surface 36, though not shown in Fig. 2, is similar. The orifice 25 is formed in a washer-like member 25a, while the constriction 23 is in a similar type of member 23a. The members 25a and 23a provide end pieces for cylindrical rings 51 and 52 assembled to provide the cavity 24 and the passage 28. In order to minimize leakage from one section of the valve to another, conventional O rings 50, 53 and 54 are provided.

While applicant does not intend to be limited to any particular shapes or sizes of parts in the servo valve described with reference to Figs. 1 and 2, there follows sizes, shapes or dimensions for the more important parts which have been found to be particularly suitable for a servo valve of the type represented by Figs. 1 and 2:

Over-all size of servo valve: 1' x 1" x 3.6"
Opening of constriction 23: .024" diameter, .002" gap length
Opening of orifice 25: .008"
Minimum input electrical signal: ± 5 milliamps
Hydraulic power output: 8 g.p.m. at 3000 p.s.i.
Inductance of motor coils: 1 henry.

Figure 3:
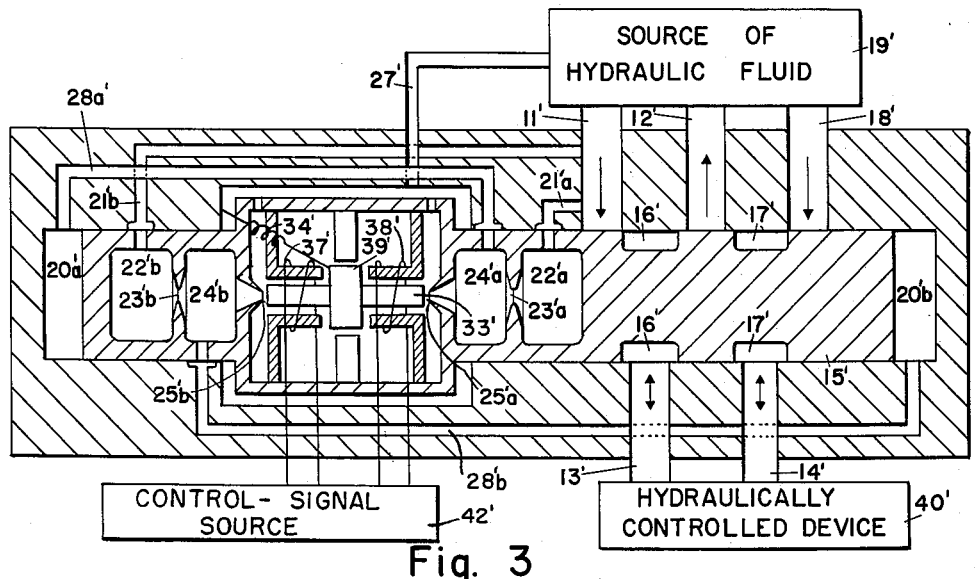
Fig. 3 is a longitudinal sectional, partially schematic, view of another embodiment of an electro-hydraulic servo valve in accordance with the present invention.

*Description and explanation of operation of the valve of Fig. 3*

Considering now the valve of Fig. 3, except for the details of construction and operation of the pilot-piston mechanism and modifications of the piston valve arising from changes in the pilot-piston mechanism, the valve of Fig. 3 is similar to that fully described with respect to Fig. 1. Those elements in the valve of Fig. 3 identical with the elements in the valve of Fig. 1 are represented by the same reference numerals in both figures.

The valve of Fig. 3 utilizes a double-acting or push-pull type of pilot piston 33'. The piston valve 15' includes a pair of pressure chambers 20'a and 20'b with the chamber 20'a connected by a passage 28'a through an intermediate chamber 24'a, a constriction 23'a, another chamber 22'a and a fluid input passage 21'a to the source 19'. The chamber 20'b is similarly connected through a passage 28'b, an intermediate chamber 24'b, a constriction 23'b, another chamber 22'b and a conduit 21'b to the source 19'.

The piston valve 15' operates in the same manner as the corresponding valve of Fig. 1 to control the hydraulically controlled device 40'. The motor members 37' and 38' operate in a conventional manner utilizing differential electric currents to move the pilot valve 33' either to the right or to the left depending on the sense of the control signal. Pressure fluid flows through passage 21'a into chamber 22'a, through constriction 23'a, chamber 24'a and orifice 25'a, and through the chamber including the pilot piston 33' and out the exhaust passage 27'. A similar flow occurs from source 19' through chambers 22'b and 24b and orifice 25b. With the pilot piston in a neutral position, the orifices 25'a and 25'b will be of equal size and the forces on the piston valve 15' developed by the pressures of the fluids in chambers 20'a and 20'b will balance to keep the piston valve 15' in a static position. As the pilot piston 33' is moved to the right constricting orifice 25'a greater force is developed in the chambers 24'a and 20'a and a lower force in chambers 24'b and 20'b resulting in an excess of force which moves the piston valve 15' to the right to re-open the orifice 25'a and re-close the orifice 25'b to reposition the pilot piston 33' in neutral position. If, on the other hand, the pilot piston 33 is initially moved to the left, the force in chambers 24'a and 20'a is diminished while that in chambers 24'b and 20'b is increased resulting in a motion of the piston valve 15' to the left to rebalance the position of the pilot valve 33'.

It is seen in the valve of Fig. 3 that the piston valve 15' may, except for the motor section, be formed into a cylindrical shape having a constant diameter except for the annular grooves providing fluid passages. Similarly, the bore of the cylinder 10', again except for the motor section, may have a constant diameter. This facilitates manufacture of the servo valve and eliminates the need for use of many of the O rings used in a piston such as represented in Fig. 1. In addition, the balanced or push-pull type of operation of the piston valve 33' provides a much more sensitive control of the piston valve 15' and minimizes the effects of variations in valve parameters, such as, fluid pressure, changes with temperature and others.

Figure 4:
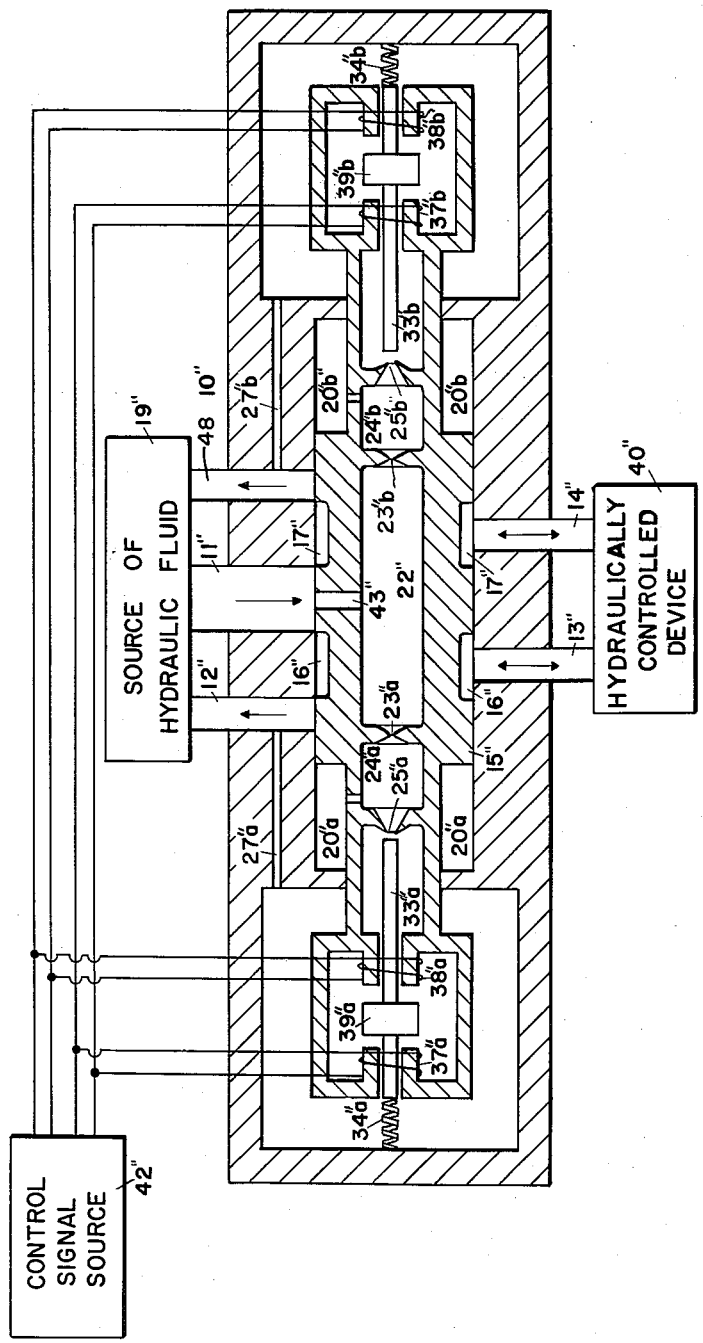
Fig. 4 is a longitudinal sectional, partially schematic, view of still another embodiment of an electro-hydraulic servo valve in accordance with the present invention.

*Description and explanation of the servo valve of Fig. 4*

The servo valve represented by Fig. 4 comprises a valve which closely resembles the valve of Fig. 1, while having the push-pull type of operation of the valve of Fig. 3. In the valve of Fig. 4 the motor means and pilot piston appearing only to the left of the valve of Fig. 1 is duplicated on both the left and right of the valve of Fig. 4. The source of hydraulic fluid 19' is connected to the valve through an input pressure conduit 11" and return pressure conduits 12" and 48. The two motor means are wired in a parallel circuit as shown so that the pilot pistons are always moved in the same direction. That is, when the pilot piston on the left of the valve of Fig. 4 is moved to the left that on the right of the valve is also moved to the left. This results in an opening of the orifice 25"a on the left of the valve with a consequent decrease in the force of the fluid in chamber 20"a, while at the same time resulting in a constriction of the orifice 26"b and the right of the valve with a consequent increase in the force of the fluid in chamber 20"b. Consequently, the piston valve 15" is moved to the left to balance the force in the chambers 20"a and 20"b and the flow of fluids through the orifices 25"a and 25"b. Motion of the pilot pistons to the right would have an opposite effect on the piston valve 15".

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A two-stage, differential, hydraulic servo valve, comprising: a valve housing including passages for fluid under pressure; a piston-valve movably mounted within said housing for controlling the flow of fluid through said passages, said piston-valve including a variable pressure-fluid chamber and at least one fluid control orifice communicating with said chamber; auxiliary passages for coupling fluid into said chamber; pilot means carried by and coupled to said piston-valve, said pilot means including a pilot valve movably mounted with respect to said orifice for effecting motion of said piston-valve with respect to said housing by varying the effective size of said orifice to change the pressure of the fluid in said chamber; and motor means carried by said piston-valve for moving said pilot valve with respect to said orifice in response to a control signal for differentially displacing said valves in response to a control signal to effect said pressure change.

2. A two-stage, differential, hydraulic servo valve, comprising: a valve housing including passages for fluid under pressure and having a cylindrical bore; a cylindrical piston-valve movably mounted within said bore for controlling the flow of fluid through said passages, said piston-valve including a variable pressure-fluid chamber and at least one fluid control orifice communicating with said chamber; auxiliary passages for coupling fluid into said chamber; pilot means carried by and coupled to said piston-valve, said pilot means including a pilot valve movably mounted with respect to said orifice for effecting motion of said piston-valve with respect to said housing by varying the effective size of said orifice to change the pressure of the fluid in said chamber; and motor means carried by said piston-valve for moving said pilot valve with respect to said orifice in response to a control signal for differentially displacing said valves in response to a control signal to effect said pressure change.

3. A two-stage, differential, hydraulic servo valve, comprising: a valve housing including passages for fluid under pressure; a piston-valve movably mounted within said housing for controlling the flow of fluid through said passages, said piston-valve including a variable pressure-fluid chamber and at least one fluid control orifice communicating with said chamber; auxiliary passages for coupling fluid into said chamber; pilot means carried by and coupled to said piston-valve, said pilot means including a pilot valve movably mounted with respect to said orifice for effecting motion of said piston-valve with respect to said housing by varying the effective size of said orifice to change the pressure of the fluid in said chamber; motor means carried by said piston-valve for moving said pilot valve with respect to said orifice in response to a control signal for differentially displacing said valves in response to a control signal to effect said pressure change; and a control pressure-fluid chamber walled by said housing and said piston-valve and communicating with said variable chamber for coupling said pressure change to said piston-valve.

4. A two-stage, differential, hydraulic servo valve, comprising: a valve housing including passages for fluid under pressure; a piston-valve movably mounted within said housing for controlling the flow of fluid through said passages, said piston-valve including a variable pressure-fluid chamber and at least one fluid control orifice communicating with said chamber; auxiliary passages for coupling fluid into said chamber; pilot means carried by and coupled to said piston-valve, said pilot means including a pilot valve movably mounted with respect to said orifice for effecting motion of said piston-valve with respect to said housing by varying the effective size of said orifice to change the pressure of the fluid in said chamber; motor means carried by said piston-valve for moving said pilot valve with respect to said orifice in response to a control signal for differentially displacing said valves in response to a control signal to effect said pressure change; and degenerative feedback means responsive to said pressure change and including a resilient means coupling said pilot valve and said housing tending to restrain said pilot valve relative to said housing and oppose said pressure change.

5. A two-stage, differential, hydraulic servo valve, comprising: a valve housing including passages for fluid under pressure; a piston-valve movably mounted within said housing for controlling the flow of fluid through said passages, said piston-valve including a variable pressure-fluid chamber and at least one fluid control orifice communicating with said chamber; auxiliary passages for coupling fluid into said chamber; pilot means carried by and coupled to said piston-valve, said pilot means including a pilot valve movably mounted with respect to said orifice for effecting motion of said piston-valve with respect to said housing by varying the effective size of said orifice to change the pressure of the fluid in said chamber; motor means carried by said piston-valve for moving said pilot valve with respect to said orifice in response to a control signal for differentially displacing said valves in response to a control signal to effect said pressure change; and a pair of control pressure-fluid chambers walled by said housing and said piston-valve at opposite ends of said piston-valve and communicating with said variable chamber for coupling said pressure change to said piston-valve.

6. A two-stage, differential, hydraulic servo valve, comprising: a valve housing including passages for fluid under pressure; a piston-valve movably mounted within said housing for controlling the flow of fluid through said passages, said piston-valve including a variable pressure-fluid chamber and at least one fluid control orifice communicating with said chamber; auxiliary passages in said housing and said piston-valve for coupling fluid into said chamber; pilot means carried by and coupled to said piston-valve, said pilot means including a pilot valve movably mounted with respect to said orifice for effecting motion of said piston-valve with respect to said housing by varying the effective size of said orifice to change the pressure of the fluid in said chamber; and motor means carried by said piston-valve for moving said pilot valve with respect to said orifice in response to a control signal for differentially displacing said valves in response to a control signal to effect said pressure change.

7. A two-stage, differential, hydraulic servo valve, comprising: a valve housing including passages for fluid under pressure; a piston-valve movably mounted within said housing for controlling the flow of fluid through said passages, said piston-valve including a variable pressure-fluid chamber and at least one fluid control orifice communicating with said chamber; auxiliary passages for coupling fluid into said chamber; pilot means carried by and coupled to said piston-valve, said pilot means including a pilot valve comprising a plunger axially movable with respect to said piston-valve and said orifice for effecting motion of said piston-valve with respect to said housing by varying the effective size of said orifice to change the pressure of the fluid in said chamber; and motor means carried by said piston-valve for moving said pilot valve with respect to said orifice in response to a control signal for differentially displacing said valves in response to a control signal to effect said pressure change.

8. A two-stage, differential, hydraulic servo valve, comprising: a valve housing including passages for fluid under pressure; a piston-valve movably mounted within said housing for controlling the flow of fluid through said passages, said piston-valve including a variable pressure-fluid chamber and at least one fluid control orifice communicating with said chamber; auxiliary passages for coupling fluid into said chamber; pilot means carried by and coupled to said piston-valve, said pilot means including a pilot valve movably mounted with respect to said orifice for effecting motion of said piston-valve with respect to said housing by varying the effective size of said orifice to change the pressure of the fluid in said chamber; motor means carried by said piston-valve for moving said pilot valve with respect to said orifice in response to a control signal for differentially displacing said valves in response to a control signal to effect said pressure change; and degenerative feedback means responsive to said pressure change and including a pilot spring mounted in said housing and supporting said pilot valve, tending to oppose motion of said pilot valve relative said housing and oppose said pressure change.

9. A two-stage, differential, hydraulic servo valve, comprising: a valve housing including passages for fluid under pressure; a piston-valve movably mounted within said housing for controlling the flow of fluid through said passages, said piston-valve including a variable pressure-fluid chamber, at least one fluid control orifice communicating with said chamber and a pair of bearings; auxiliary passages for coupling fluid into said chamber; pilot means carried by and coupled to said piston-valve, said pilot means including a pilot valve mounted in said bearings and movable with respect to said orifice for effecting motion of said piston-valve with respect to said housing by varying the effective size of said orifice to change the pressure of the fluid in said chamber; and motor means carried by said piston-valve for moving said pilot valve with respect to said orifice in response to a control signal for differentially displacing said valves in response to a control signal to effect said pressure change.

10. A two-stage, differential, hydraulic servo valve, comprising: a valve housing including passages for fluid under pressure and having a cylindrical bore; a cylindrical piston-valve movably mounted within said bore for controlling the flow of fluid through said passages, said piston-valve including a variable pressure-fluid chamber and at least one fluid control orifice communicating with said chamber; auxiliary passages for coupling fluid into said chamber; pilot means carried by and coupled to said piston-valve, said pilot means including a pilot valve movably mounted with respect to said orifice for effecting motion of said piston-valve with respect to said housing by varying the effective size of said orifice to change the pressure of the fluid in said chamber; motor means carried by said piston-valve for moving said pilot valve with respect to said orifice in response to a control signal for differentially displacing said valves in response to a control signal to effect said pressure change; a control pressure-fluid chamber walled by said housing and said piston-valve and communicating with said variable chamber for coupling said pressure change to said piston-valve; and degenerative feedback means responsive to said pressure change and including a resilient means coupling said pilot valve and said housing tending to restrain said pilot valve relative said housing and oppose said pressure change.

11. A two-stage, differential, hydraulic servo valve, comprising: a valve housing including passages for fluid under pressure; a piston-valve movably mounted within said housing for controlling the flow of fluid through said passages, said piston-valve including a variable pressure-fluid chamber and at least one fluid control orifice communicating with said chamber; auxiliary passages for coupling fluid into said chamber; pilot means carried by and coupled to said piston-valve, said pilot means including a pilot valve movably mounted with respect to said orifice for effecting motion of said piston-valve with respect to said housing by varying the effective size of said orifice to change the pressure of the fluid in said chamber; and electromagnetic motor means carried by said piston-valve for moving said pilot valve with respect to said orifice in response to a control signal for differentially displacing said valves in response to a control signal to effect said pressure change.

12. A two-stage, differential, hydraulic servo valve, comprising: a valve housing including passages for fluid under pressure; a piston-valve movably mounted within said housing for controlling the flow of fluid through said passages, said piston-valve including a pair of variable pressure-fluid chambers and at least one fluid control orifice communicating with each said chamber; auxiliary passages for coupling fluid into said chambers; pilot means carried by and coupled to said piston-valve, said pilot means including a pilot valve movably mounted with respect to said orifices for effecting motion of said piston-valve with respect to said housing by varying the effective size of said orifices to change the pressures of the fluid in said chambers; and motor means carried by said piston-valve for moving said pilot valve with respect to said orifices in response to a control signal for differentially displacing said valves in response to a control signal to effect said pressure changes.

13. A two-stage, differential, hydraulic servo valve, comprising: a valve housing including passages for fluid under pressure; a piston-valve movably mounted within said housing for controlling the flow of fluid through said passages, said piston-valve including a pair of variable pressure-fluid chambers and at least one fluid control orifice communicating with each said chamber; auxiliary passages for coupling fluid into said chambers; pilot means carried by and coupled to said piston-valve, said pilot means including a pilot valve movably mounted with respect to said orifices for effecting motion of said piston-valve with respect to said housing by varying the effective size of said orifices inversely with respect to each other to change the pressure of the fluid in said chamber; and motor means carried by said piston-valve for moving said pilot valve with respect to said orifices in response to a control signal for differentially displacing said valves in response to a control signal to effect said pressure change.

14. A two-stage, differential, hydraulic servo valve, comprising: a valve housing including passages for fluid under pressure; a piston-valve movably mounted within said housing for controlling the flow of fluid through said passages, said piston-valve including a pair of variable pressure-fluid chambers and at least one fluid control orifice communicating with each said chamber; auxiliary passages for coupling fluid into said chambers; pilot means carried by and coupled to said piston-valve, said pilot means including a pair of pilot valves movably mounted with respect to said orifices for effecting motion of said piston-valve with respect to said housing by varying the effective size of said orifices to change the pressures of the fluid in said chambers; and a pair of motor means carried by said piston-valve for moving said pilot valve with respect to said orifice in response to a control signal for differentially displacing said piston and pilot valves in response to a control signal to effect said pressure changes.

15. A two-stage, differential, hydraulic servo valve, comprising: a valve housing including passages for fluid under pressure; a piston-valve movably mounted within said housing for controlling the flow of fluid through said passages, said piston-valve including a pair of variable pressure-fluid chambers and at least one fluid control orifice communicating with each said chamber; auxiliary passages for coupling fluid into said chambers; pilot means carried by and coupled to said piston-valve, said pilot means including a pair of pilot valves movably mounted with respect to said orifices for effecting motion of said piston-valve with respect to said housing by varying the effective size of said orifices to change the pressures of the fluid in said chambers; and a pair of parallel connected electromagnetic motor means carried by said piston-valve for moving said pilot valve with respect to said orifice in response to a control signal for differentially displacing said valves in response to a control signal to effect said pressure change.

References Cited in the file of this patent

UNITED STATES PATENTS

| | | |
|---|---|---|
| 2,500,407 | Segerstad | Mar. 14, 1950 |
| 2,601,867 | Alyea | July 1, 1952 |
| 2,615,466 | Garde | Oct. 28, 1952 |
| 2,644,427 | Sedgfield | July 7, 1953 |
| 2,767,689 | Moog | Oct. 23, 1956 |
| 2,780,917 | Lamond | Feb. 12, 1957 |
| 2,824,574 | Place | Feb. 25, 1958 |

FOREIGN PATENTS

| | | |
|---|---|---|
| 53,192 | Austria | Apr. 25, 1912 |
| 112,466 | Switzerland | Nov. 2, 1925 |
| 372,258 | Great Britain | May 5, 1932 |
| 492,292 | Germany | Feb. 6, 1930 |
| 525,878 | Germany | June 4, 1931 |
| 554,070 | Great Britain | June 18, 1943 |
| 918,722 | Germany | July 18, 1949 |
| 910,115 | France | Mar. 28, 1946 |